United States Patent [19]

Nakamura

[11] Patent Number: 5,059,796
[45] Date of Patent: Oct. 22, 1991

[54] INFRARED MONITORING SYSTEM

[75] Inventor: Tetsuya Nakamura, Machida, Japan

[73] Assignee: Fujitsu Limited, Kawasaki, Japan

[21] Appl. No.: 531,152

[22] Filed: May 31, 1990

[30] Foreign Application Priority Data

May 31, 1989 [JP] Japan ................... 1-138270

[51] Int. Cl.$^5$ .......................... G06K 9/00; G01J 5/18
[52] U.S. Cl. .................................. 250/330; 250/332; 250/334; 250/342; 382/1; 382/25; 340/565
[58] Field of Search ............... 250/330, 332, 334, 342, 250/347; 358/105, 113; 340/565, 500, 577; 382/1, 25, 50

[56] References Cited

U.S. PATENT DOCUMENTS

| | | | |
|---|---|---|---|
| H713 | 11/1989 | Mau et al. | 364/517 |
| 4,319,332 | 3/1982 | Mehnert | 340/557 X |
| 4,555,800 | 11/1985 | Nishikawa et al. | 382/25 |
| 4,704,533 | 11/1987 | Rose et al. | 250/342 |
| 4,845,764 | 7/1989 | Veda et al. | 382/25 X |
| 4,866,275 | 9/1989 | Jaeger et al. | 250/330 |
| 4,877,940 | 10/1989 | Bangs et al. | 219/124.34 |
| 4,887,303 | 12/1989 | Hongo | 382/25 X |
| 4,920,572 | 4/1990 | Sugita et al. | 382/25 X |

FOREIGN PATENT DOCUMENTS 01-140296 6/1989 Japan .
01-288086 11/1989 Japan .

OTHER PUBLICATIONS

Frei et al., "Digital Image Change Detection", Optical Engineering, vol. 19, No. 3, Jun. 1980, pp. 331-338.

Primary Examiner—Constantine Hannaher
Assistant Examiner—Edward J. Glick
Attorney, Agent, or Firm—Staas & Halsey

[57] ABSTRACT

An infrared monitoring system includes a histogram calculation circuit which detects an alarm area having a plurality of pixels more than a threshold number of pixels and having a temperature higher than a threshold temperature and which generates a first alarm signal when detecting the alarm area. The infrared monitoring system also includes a shape recognition circuit which determines whether or not a shape of the temperature change area corresponds to a predetermined shape and which generates a second alarm signal when determining that the shape of the temperature change area corresponds to the predetermined shape. An alarm device included in the infrared monitoring system generates an alarm such as a siren when both the first and second alarm signals are generated. In place of or in addition to the shape recognition circuit, a temperature profile circuit is used which determines whether or not a relative position of a pixel having a highest temperature contained in the temperature change area to a vertical width of the temperature change area is in a predetermined range and which generates an alarm signal when determining that the relative position of the pixel is in the predetermined range. The alarm device generates the alarm when the alarm signal from the histogram calculation circuit and at least one of the alarm signals from the shape recognition circuit and the temperature profile calculation circuits are generated.

17 Claims, 6 Drawing Sheets

INFRARED MONITORING SYSTEM

BACKGROUND OF THE INVENTION

The present invention generally relates to an infrared monitoring system, and more particularly to an infrared monitoring system suitable for application to a security system directed to detecting a trespasser.

A security system which can detect a trespasser accurately is demanded. An infrared monitoring system is suitable for such a security system. An infrared monitoring system is disclosed in U.S. patent application Ser. No. 276,669, assigned to the common assignee of the present application, Fujitsu Limited. The disclosed infrared monitoring system is designed to be applied to a power facility monitoring system and is thus not suitable for a monitoring system directed to detecting a trespasser.

SUMMARY OF THE INVENTION

A general object of the present invention is to provide an infrared monitoring system capable of detecting a trespasser accurately.

A more specific object of the present invention is to provide an infrared monitoring system capable of distinguishing a trespasser from animals, vehicles and so on.

The above-mentioned objects of the present invention are achieved by an infrared monitoring system comprising:

an infrared camera outputting temperature data related to a pictured scene scanned in a predetermined time corresponding to one frame;

memory means for storing the temperature data supplied from the infrared camera; and difference calculation means, coupled to the memory means, for receiving the temperature data related to two consecutive frames and for calculating the difference between the temperature data related to the two consecutive frames;

binarization means, coupled to the difference calculation means, for classifying the pictured scene into a background area having no temperature change and a temperature change area having a temperature change between the two consecutive frames from the difference supplied from the difference calculation means;

extraction means, coupled to the memory means and the binarization means, for extracting temperature data related to the temperature change area from the temperature data stored in the memory means;

calculation means, coupled to the extraction means, for detecting an alarm area having a plurality of pixels more than a threshold number of pixels and having a temperature higher than a threshold temperature and for generating a first alarm signal when the alarm area is detected;

shape recognition means, coupled to the binarization means, for determining whether or not a shape of the temperature change area corresponds to a predetermined shape and for generating a second alarm signal when it is determined that the shape of the temperature change area corresponds to the predetermined shape; and alarm generating means, coupled to the calculation means and the shape recognition means, for generating an alarm when both the first and second alarm signals are generated by the calculation means and the shape recognition means, respectively.

In place of or in addition to the aforementioned shape recognition means, the infrared monitoring system includes second calculation means, coupled to the extraction means, for determining whether or not a relative position of a pixel having the highest temperature contained in the temperature change area to a vertical width of the temperature change area is in a predetermined range and for generating a third alarm signal when it is determined that the relative position of the pixel is in the predetermined range. The vertical width is a width measured along a direction corresponding to a vertical direction of the pictured scene. In this case, alarm generating means generates an alarm when the first alarm signal from the calculation means and at least one of the second alarm signal from the shape recognition means and the third alarm signal from the second calculation means are generated.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENT

Figure 1:
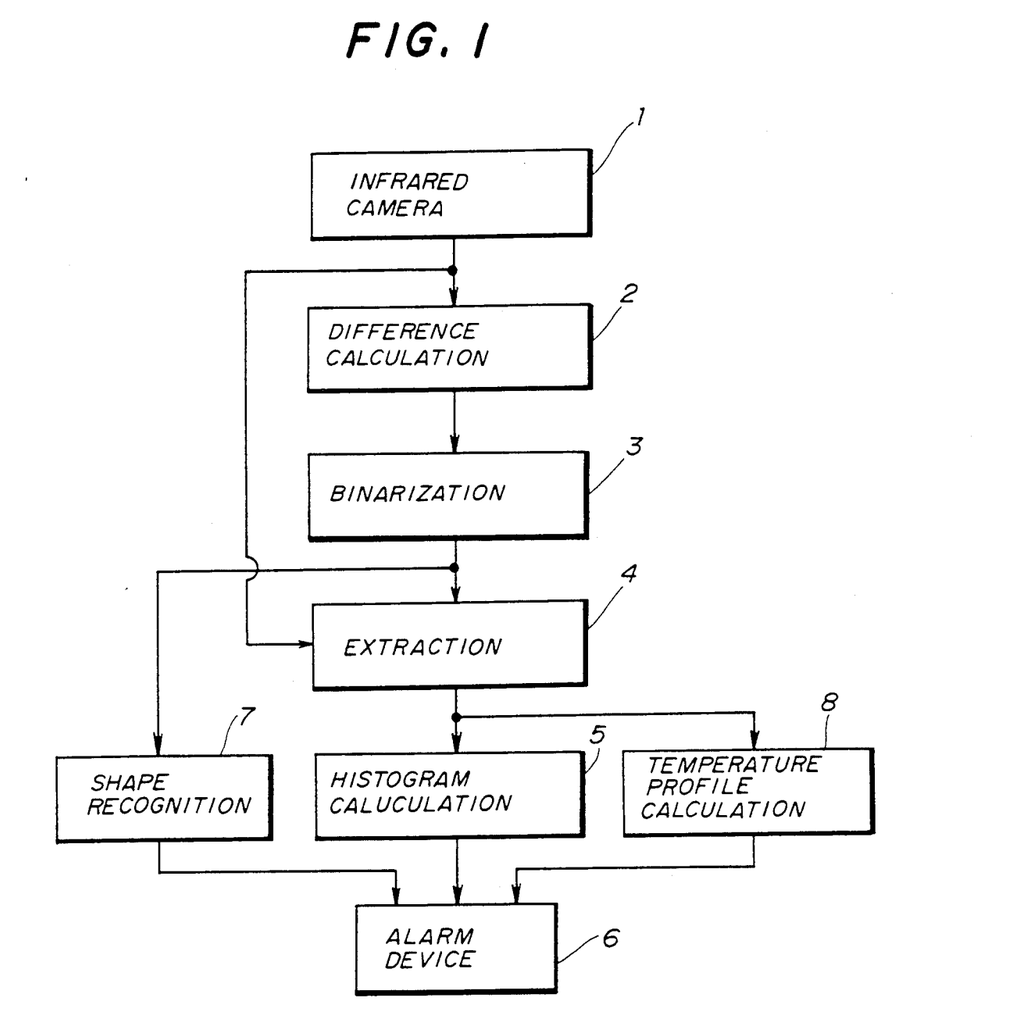
FIG.1 is a block diagram of a general structure of an infrared monitoring system according to a preferred embodiment of the present invention.

Referring to FIG.1, there is illustrated a general structure of an infrared monitoring system according to a preferred embodiment of the present invention. The system shown in FIG.1 is made up of an infrared camera 1, a difference calculation block 2, a binarization block 3, an extraction block 4, a histogram calculation block 5, an alarm device 6, a shape recognition block 7 and a temperature profile calculation block 8.

The difference calculation block 2 calculates the difference between image data related to two consecutive frames supplied from the infrared camera 1. Image data related to one frame forms one picture scanned in 1/30 second for example. It will be noted that image data from the infrared camera 1 is representative of temperature. Thus, the difference calculation block 2 outputs temperature difference data. The binarization block 3 classifies pixels contained in one frame being considered into a temperature change area and a background area from the temperature difference data supplied from the difference calculation block 2. The extraction block 4 extracts detected temperature data which is supplied from the infrared camera 1 and which is related to the temperature change area. The histogram calculation block 5 calculates the number of pixels for each detection temperature from the detected temperature data extracted by the extraction block 4 and forms a histogram which indicates the number of pixels for each detection temperature. Further, the histogram calculation block 5 compares the histogram with a threshold temperature and a threshold number of pixels. Moreover, the histogram calculation block 5 identifies an alarm area in the picture being considered which has a temperature higher than the threshold temperature and a number of pixels greater than the threshold number of pixels, and outputs an alarm signal.

The shape recognition block 7 calculates the ratio of the vertical width to the horizontal width of the temperature change area identified by the binarization block 3 and compares the calculated vertical width to horizontal width ratio with threshold ratios. Then the shape recognition block 7 generates an alarm signal when the calculated vertical width to horizontal width ratio is in a range defined by the threshold ratio. The temperature profile calculation block 8 calculates, from the detected temperature data supplied from the extraction block 4, a relative position of the pixel having the highest temperature to the vertical width of the temperature change area. The calculated relative position of the highest-temperature pixel is hereafter referred to as the center of gravity in temperature profile. Then the temperature profile calculation block 8 determines whether or not the calculated center of gravity in temperature profile is in a range defined by threshold values. When the determination result is affirmative, the temperature profile calculation block 8 outputs an alarm signal.

The alarm device 6 generates an alarm when it receives the alarm signal from the histogram calculation block 5 and at least one of the alarm signals supplied from the shape recognition block 7 and the temperature profile calculation block 8.

It should be noted that the infrared monitoring system according to the present invention has at least either one of the shape recognition block 7 or the temperature profile calculation block 8. It will be noted that the vertical width to horizontal width ratio for a human being is different from that for animals, vehicles or the like. Thus, the calculation of the vertical width to horizontal width ratio is useful for distinguishing a human being from animals, vehicles or the like. It will also be noted that the center of gravity in temperature profile (highest temperature position) related to a human being is located at an upper position in the temperature profile. On the other hand, the center of gravity in temperature profile related to animals, vehicles or the like is located at a lower position in the temperature profile.

Figure 2:
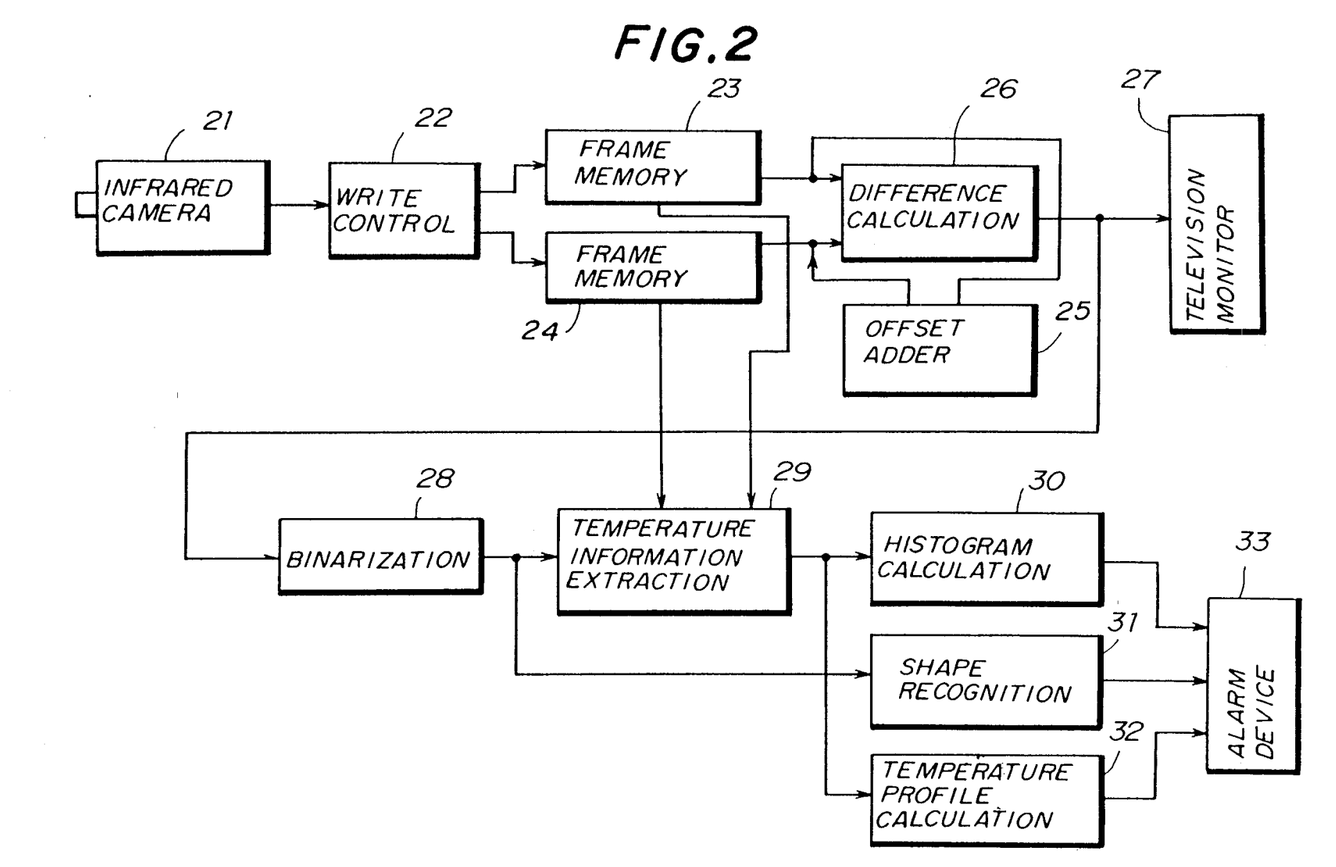
FIG.2 is a block diagram of a more detailed structure of the infrared monitoring system shown in FIG.1.

Referring to FIG.2, there is illustrated a detailed structure of the infrared monitoring system according to the preferred embodiment of the present invention. An infrared camera 21 outputs an analog image signal of an object scene representative of temperature information, which is input to a write controller 22. The write controller 22 converts the received analog image signal into a digital signal so that detected temperature data is generated for each pixel. The digital signal is alternatively written into frame memories 23 and 24 in a unit of frame. That is, each of the frame memories 23 and 24 has detected temperature data related to pixels contained in one frame. The detected temperature data are read out from the frame memories 23 and 24 in synchronism with each other and are then supplied to a difference calculator 26. An offset adder 25 generates an offset value which corresponds to 20° C., for example.

The offset value is added to detected temperature data related to the latest frame (which is read out from the frame memory 24 for example). Then the detected temperature data with the offset value added is supplied to a difference calculator 26. On the other hand, the offset value is not added to detected temperature data related to the immediately previous frame (which is read out from the frame memory 23 in the case where the detected temperature data related to the latest frame is read out from the frame memory 24). That is, the detected temperature data related to the immediately previous frame is directly input to the difference calculator 26. The difference calculator 26 calculates the difference between the offset value added detected temperature data related to the latest frame and the detected temperature data related to the immediately previous frame, and generates temperature difference data therefrom. A television set monitor 27 displays the temperature difference data from the difference calculator 26 by, for example, highlighting an area in which a change in temperature is observed. The temperature difference data is also supplied to a binarization circuit 28.

The binarization circuit 28 binarizes the temperature difference data so that a binary "0" is given to each pixel having the offset value (equal to 20° C. for example) and a binary "1" is given to each pixel having a temperature different from the offset value. Thereby, the frame being considered is divided into a background temperature area (consisting of pixels each having "0") and a temperature change area (consisting of pixels each having "1").

Figure 3:
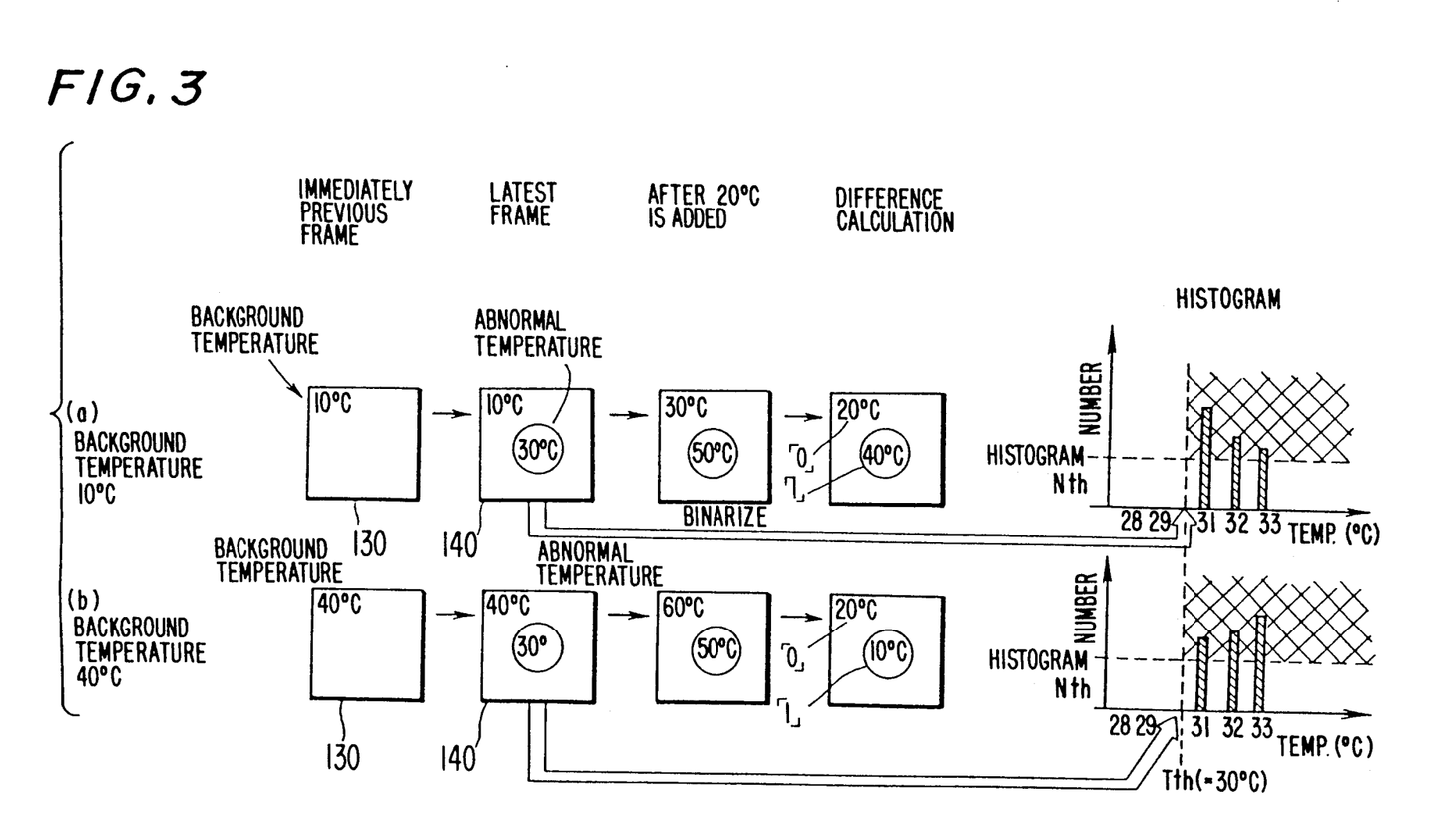
FIG.3 is a diagram illustrating the operation of a difference calculator and an offset adder shown in FIG.2.

It will be noted that the offset adder 25 is provided so that temperature difference data has positive values without exception and thus the binarization process is made simple. Referring to FIG.3(a), there is illustrated the operation of the difference calculator 26 when the background temperature is equal to 10° C. The detected temperature data related to an immediately previous frame 130 indicates a background temperature of 10° C., and the detected temperature data related to a latest frame 140 indicates a background temperature of 10° C. and an abnormal temperature of 30° C. or higher. In the following description, it is assumed that the abnormal temperature is equal to 30° C. for the sake of simplicity. The offset value which corresponds to a temperature of 20° C. is added to the detected temperature data related to the latest frame 140. Then the difference between the detected temperature data with the offset value added and the detected temperature data related to the immediately previous frame 130 is calculated. The calculated temperature difference indicates an area having a temperature of 20° C. and an area having a temperature of 40° C. (temperature change area). Thus, "0" is given to each pixel in the area having a temperature of 20° C. and "1" is given to each pixel in the area having a temperature of 40° C.

FIG.3(b) illustrates the operation of the difference calculator 26 when the background temperature is equal to 40° C. The detected temperature data related to the immediately previous frame 130 indicates a background temperature of 40° C., and the detected temperature data related to the latest frame 140 indicates a background temperature of 40° C. and an abnormal temperature of 30° C. In this case, if no offset value is added to the detected temperature data related to the latest frame 140, the temperature difference between the detected temperature data related to the latest frame 140 and the immediately previous frame 130 becomes negative. The temperature difference data indicated by a negative value makes a subsequent signal processing complex. The offset value corresponding to a temperature of 20° C. is added to the detected temperature data related to the latest frame 140. Then the temperature difference is calculated. The temperature difference in the case of FIG.3(b) indicates an area having a temperature of 20° C. (to which "0" is given) and an area (temperature change area) having a temperature of 10° C. (to which "1" is given).

A temperature information extracting circuit 29 extracts detected temperature data related to pixels contained in the temperature change area designated by binary ones supplied from the binarization circuit 28 from the detected temperature data related to the latest frame (which is supplied from the frame memory 24 for example). The extracted detected temperature data related to the temperature change area is supplied to a histogram calculation circuit 30 and a temperature profile calculation circuit 32.

Figure 4A:
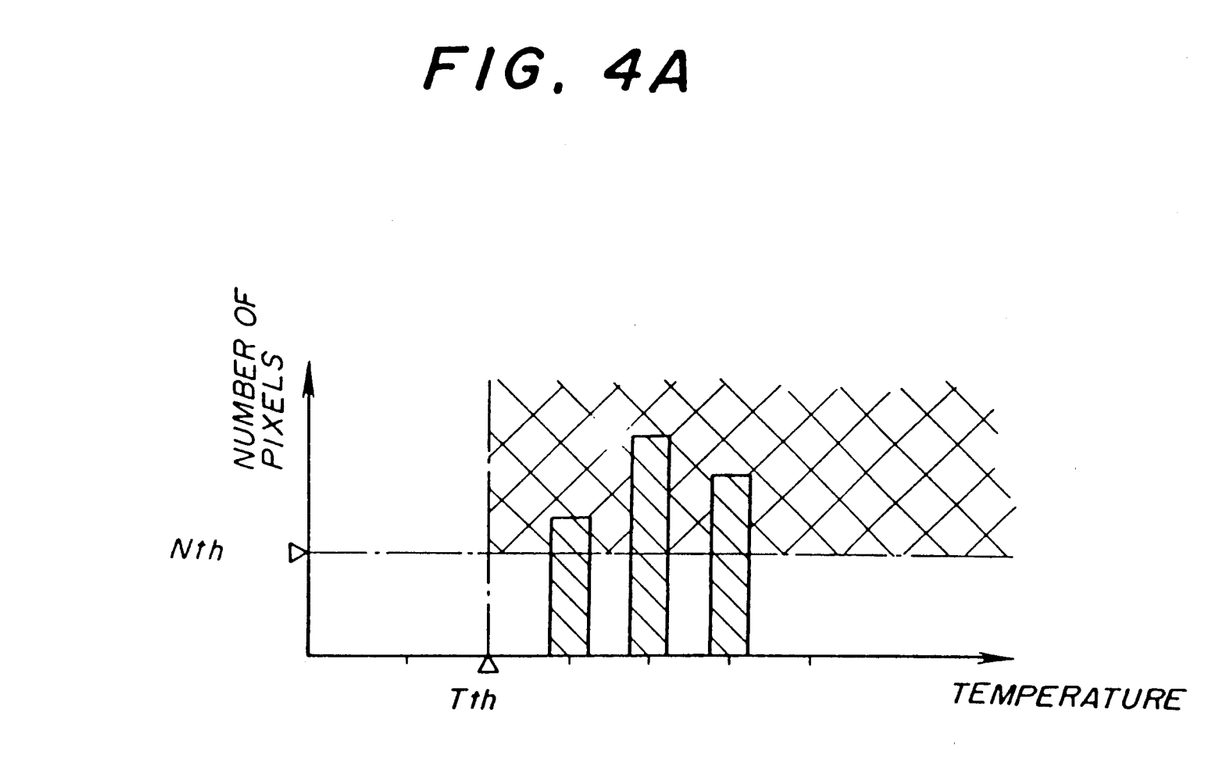
FIG.4A is a diagram illustrating a histogram operation executed by a histogram calculation circuit shown in FIG.2.

The histogram calculation circuit 30 calculates the number of pixels for every detection temperature and generates a histogram as shown in FIG.4A or FIG.3. The histogram generated by the histogram calculation circuit 30 represents a distribution of pixels as a function of temperature. The horizontal axis of the histogram represents the temperature, and the vertical axis thereof represents the number of pixels. The histogram calculation circuit 30 has a threshold temperature Tth and a threshold number of pixels Nth. An area having temperatures equal to or greater than the threshold temperature Tth and a number of pixels equal to or greater than the threshold number of pixels Nth is an alarm area. In FIG.4A and FIG.3, the hatched areas indicate the alarm areas.

Figure 4B:
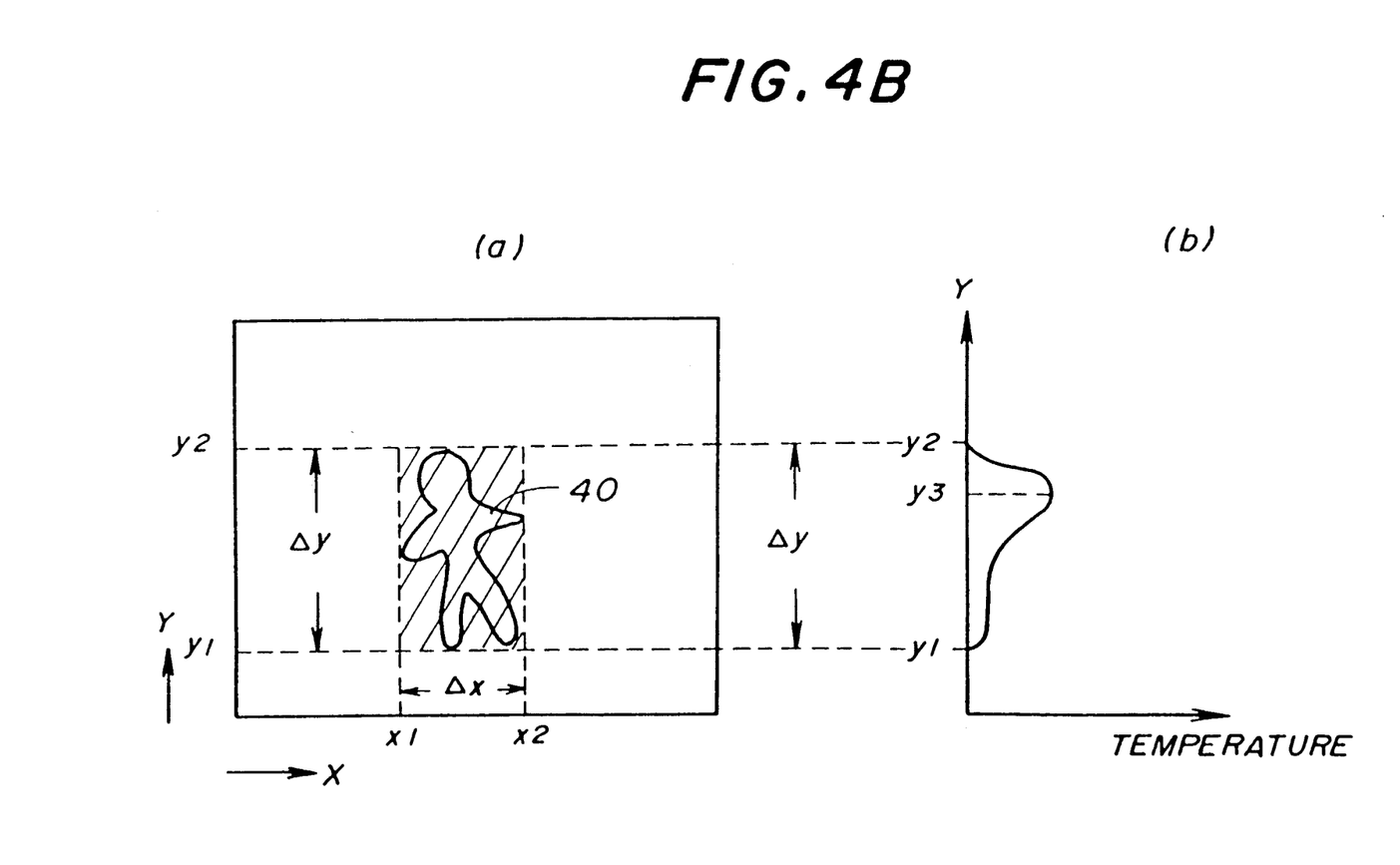
FIG.4B is a diagram illustrating a shape recognition operation and a temperature profile calculation which are executed by a shape recognition circuit and a temperature profile calculation circuit, respectively.

A shape recognition circuit 31 receives binary data related to one frame supplied from the binarization circuit 28 and performs the following calculation procedure as illustrated in FIG.4B-(a). A hatched area indicated by reference numeral 40 is a temperature change area in one frame. The pixels in the temperature change area are represented by binary "1". The shape recognition circuit 31 subjects the temperature change area 40 to a conventional image projection process so that x coordinate values x1 and x2 (>x1) and y coordinate values y1 and y2 (>y1) are obtained. Then the shape recognition circuit 31 calculates a vertical width $\Delta y$ (y2−y1) and a horizontal width $\Delta x$ (=x2−x1). Then the shape recognition circuit 31 calculates the ratio of the vertical width $\Delta y$ to the horizontal width $\Delta x$. After that, the shape recognition circuit 31 compares $\Delta y/\Delta x$ with threshold values RTH1 (equal to 3 for example) and RTH2 (equal to 6 for example) as follows:

$$RTH1 < \Delta y/\Delta x < RTH2 \qquad (1).$$

When inequality (1) is satisfied, the shape recognition circuit 31 generates an alarm signal. Animals, vehicles and so on have a temperature change area having $\Delta x$ much greater than $\Delta y$. Such a temperature change area does not satisfy inequality (1) and thus the alarm signal is not generated.

The temperature profile calculation circuit 32 generates a temperature profile (graph) as shown in FIG.4B-(b) and extracts the y coordinate of the pixel having the highest temperature for each of the y coordinate values in the temperature change area 40. The horizontal axis of the temperature profile shown in FIG.4B-(b) represents the temperature and the vertical axis represents the y coordinate values. It will be noted that y coordinate value y1 corresponds to the lowermost end of the temperature change area 40, and y coordinate value y2 corresponds to the uppermost end of the temperature change area 40. Then the temperature profile calculation circuit 32 detects y coordinate value y3 related to the pixel having the highest temperature in the temperature change area 40. Then the temperature profile calculation circuit 32 calculates the center of gravity YG in the temperature profile shown in FIG.4B-(b) by the following formula:

$$YG = (y2 - y3)/\Delta y \qquad (2).$$

Then the temperature profile calculation circuit 32 compares the center of gravity YG in the temperature profile with threshold values GTH1 (equal to 0.2 for example) and GTH2 (equal to 0.3 for example) as follows:

$$GTH1 < YG < GTH2 \qquad (3).$$

When inequality (3) is satisfied, the temperature profile calculation circuit 32 generates an alarm signal. It will be noted that the center of gravity in temperature profile for a human being is located at a face thereof (an upper portion of the temperature profile). On the other hand, animals have uniform temperature distributions and thus do not have the center of gravity in temperature profile. Vehicles have the center of gravity at the wheels or the engine (a lower portion of the temperature profile). Thus, the temperature profile calculation circuit 32 does not generate the alarm signal for animals, vehicles or the like.

An alarm device 33 is connected to outputs of the histogram calculation circuit 30, the shape recognition circuit 31 and the temperature profile calculation circuit 32. The alarm device 33 generates an alarm such as a siren or an alarm indication when the alarm signals are supplied from the histogram calculation circuit 30 and at least either one of the shape recognition circuit 31 or the temperature profile calculation circuit 32. Alternatively, it is possible to design the system so that only when all the circuits 30 generate the alarm signals, the alarm device 33 generates an alarm.

Figure 5:
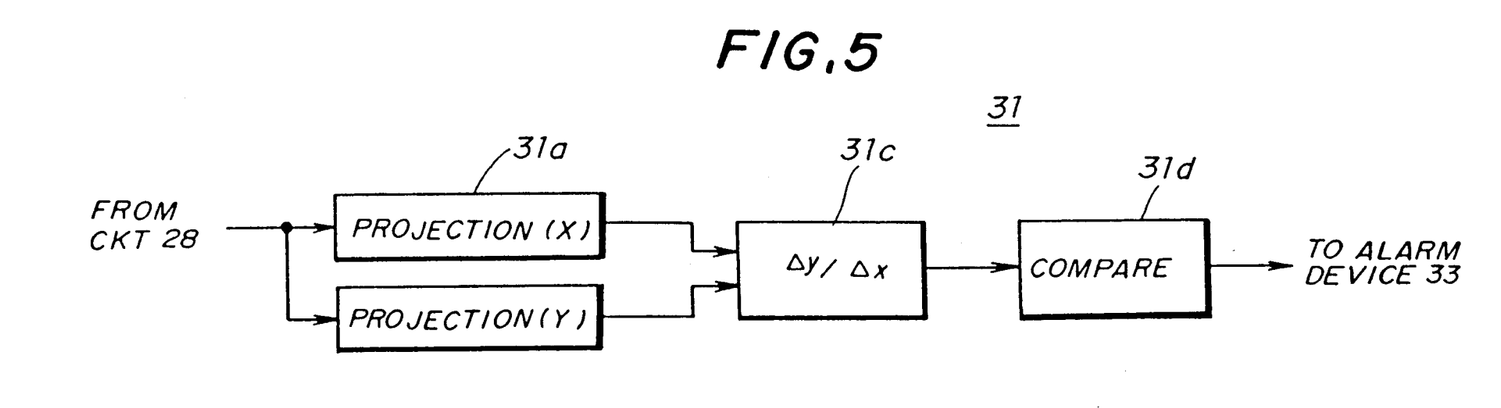
FIG.5 is a block diagram of the shape recognition circuit shown in FIG.2.

FIG.5 is a block diagram of the shape recognition circuit 31 shown in FIG.2. The shape recognition circuit 31 is composed of an X-direction projection circuit 31a, a Y-direction projection circuit 31b, a ratio calculation circuit 31c, and a comparison circuit 31d. The X-direction projection circuit 31a subjects the output signal to the X-direction projection procedure, and the Y-direction projection circuit 31b subjects the output signal to the Y-direction projection procedure. The ratio calculation circuit 31c calculates the ratio $\Delta y/\Delta x$. The comparison circuit 31d executes the aforementioned inequality (1).

Figure 6:
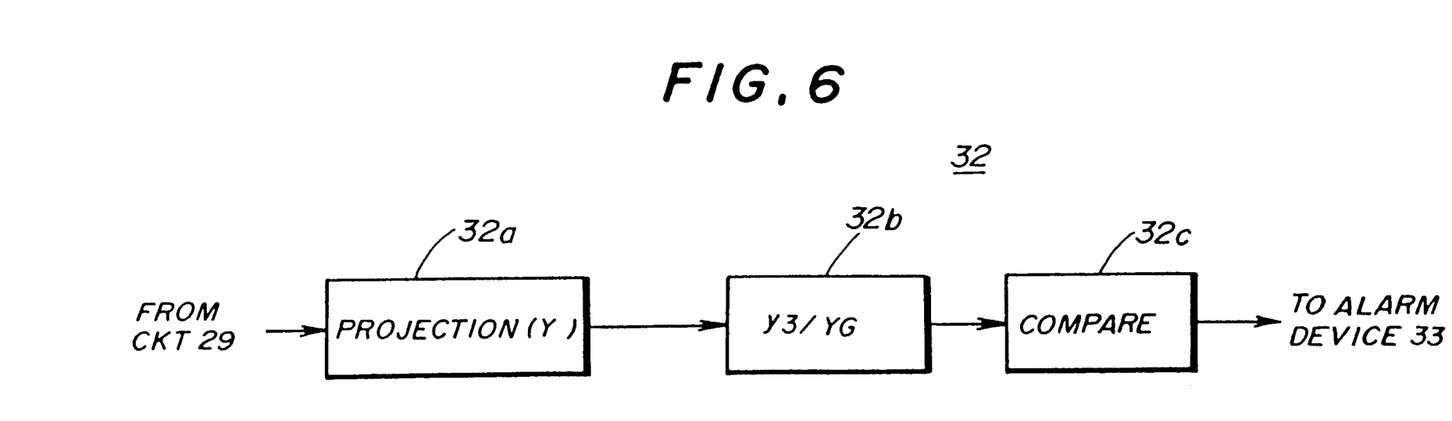
FIG.6 is a block diagram of the temperature profile calculation circuit shown in FIG.2.

FIG.6 is a block diagram of the temperature profile calculation circuit 32 shown in FIG.2. The temperature profile calculation circuit 32 is composed of a Y-direction projection circuit 32a, a y3 detection/YG calculation circuit 32b, and a comparison circuit 32c. The Y-direction projection circuit 32a operates in the same way as the Y-direction projection circuit 31b. The y3 detection/YG calculation circuit 32b detects the aforementioned y coordinate value y3 and calculates YG according to the aforementioned formula (2). The comparison circuit 32c executes the aforementioned inequality (3).

It will be noted that the calculation algorithms themselves executed in the circuits shown in FIG.2 are simple and can be easily implemented by software or hardware. The ratio $\Delta x/\Delta y$ may be used instead of the ratio $\Delta y/\Delta x$. Alternatively, it is possible to design the shape recognition circuit 31 so that it generates the alarm signal when $\Delta y$ is greater than $\Delta x$. In this case, the recognition rate is greater than that obtained when the aforementioned inequality (1) is employed. However, it should be noted that the rate of erroneous detection obtained when the above-mentioned alternative is employed is less than that obtained when the alarm device 33 (FIG.2) generates an alarm on the basis of only the alarm signal from the histogram calculation circuit 30. Alternatively, it is possible to design the temperature profile circuit 32 so that it generates the alarm signal when the ratio YG is greater than 0.5. In this case, the rate of erroneous detection is greater than that obtained when the aforementioned inequality (3) is employed. However, it should be noted that the rate of erroneous detection obtained when the above-mentioned alternative is employed is less than that obtained when the alarm device 33 (FIG.2) generates an alarm on the basis of only the alarm signal from the histogram calculation circuit 30.

The present invention is not limited to the aforementioned embodiment, and variations and modifications may be made without departing from the scope of the present invention.

What is claimed is:

1. An infrared monitoring system comprising:
    an infrared camera outputting temperature data related to a pictured scene scanned in a predetermined time corresponding to one frame;
    memory means for storing said temperature data supplied from said infrared camera;
    difference calculation means, coupled to said memory means, for receiving said temperature data related to two consecutive frames and for calculating a difference between said temperature data related to said two consecutive frames;
    binarization means, coupled to said difference calculation means, for classifying said pictured scene into a background area having no temperature change and a temperature change area having a temperature change between said two consecutive frames from said difference supplied from said difference calculation means;
    extraction means, coupled to said memory means and said binarization means, for extracting temperature data related to said temperature change area from said temperature data stored in said memory means;
    calculation means, coupled to said extraction means, for detecting an alarm area having a plurality of pixels more than a threshold number of pixels and having a temperature higher than a threshold temperature and for generating a first alarm signal when said alarm area is detected;
    shape recognition means, coupled to said binarization means, for determining whether or not a shape of said temperature change area corresponds to a predetermined shape and for generating a second alarm signal when it is determined that the shape of said temperature change area corresponds to said predetermined shape; and
    alarm generating means, coupled to said calculation means and said shape recognition means, for generating an alarm when both said first and second alarm signals are generated by said calculation means and said shape recognition means, respectively.

2. An infrared monitoring system as claimed in claim 1, wherein said shape recognition means comprises:
    ratio calculation means for calculating a ratio of a vertical width of said temperature change area to a horizontal width thereof, said vertical width being a width measured along a direction corresponding to a vertical direction of said pictured scene, said horizontal width being a width measured along a direction corresponding to a horizontal direction of said pictured scene; and
    determination means, coupled to said ratio calculation means, for determining whether or not said ratio of the vertical width to the horizontal width of said temperature change area is in a predetermined range; and wherein:
    said shape recognition means generates said second alarm signal when said determination means determines that said ratio of the vertical width to the horizontal width of said temperature change area is in said predetermined range.

3. An infrared monitoring system as claimed in claim 2, wherein said predetermined range is defined by a first threshold value and a second threshold value which is greater than said first threshold value.

4. An infrared monitoring system as claimed in claim 1, wherein said shape recognition means generates said second alarm signal when a vertical width of said temperature change area measured along a direction corresponding to a vertical direction of said pictured scene is greater than a horizontal width of said temperature change area measured along a direction corresponding to a horizontal direction of said pictured scene.

5. An infrared monitoring system as claimed in claim 1, wherein said binarization means gives each pixel in said background area a first predetermined binary value and gives each pixel in said temperature change area a second predetermined binary value.

6. An infrared monitoring system as claimed in claim 1, wherein said difference calculation means comprises means for subtracting said temperature data related to a previous frame which is one of said two consecutive frames from said temperature data related to a latest frame which is the other one of said two consecutive frames.

7. An infrared monitoring system comprising:
    an infrared camera outputting temperature data related to a pictured scene scanned in a predetermined time corresponding to one frame;
    memory means for storing said temperature data supplied from said infrared camera;
    difference calculation means, coupled to said memory means, for receiving said temperature data related to two consecutive frames and for calculating a difference between said temperature data related to said two consecutive frames;
    binarization means, coupled to said difference calculation means, for classifying said pictured scene into a background area having no temperature change and a temperature change area having a temperature change between said two consecutive frames from said difference supplied from said difference calculation means;

extraction means, coupled to said memory means and said binarization means, for extracting temperature data related to said temperature change area from said temperature data stored in said memory means;

first calculation means, coupled to said extraction means, for detecting an alarm area having a plurality of pixels more than a threshold number of pixels and having a temperature higher than a threshold temperature and for generating a first alarm signal when said alarm area is detected;

second calculation means, coupled to said extraction means, for determining whether or not a relative position of a pixel having a highest temperature contained in said temperature change area to a vertical width of said temperature change area is in a predetermined range and for generating a second alarm signal when it is determined that the relative position of said pixel is in said predetermined range, said vertical width being a width measured along a direction corresponding to a vertical direction of said pictured scene; and alarm generating means, coupled to said first and second calculation means, for generating an alarm when both said first and second alarm signals are generated by said first and second calculation means, respectively.

8. An infrared monitoring system as claimed in claim 7, wherein said second calculation means comprises:

relative position calculating means for calculating a ratio of a position of said pixel having the highest temperature measured from a top of said temperature change area to said vertical width thereof; and determination means, coupled to said ratio calculation means, for determining whether or not said ratio indicative of said relative position of said pixel having the highest temperature is in a predetermined ratio range; and wherein:

said second calculation means generates said second alarm signal when said determination means determines that said ratio is in said predetermined ratio range.

9. An infrared monitoring system as claimed in claim 8, wherein said predetermined ratio range is defined by a first threshold value and a second threshold value which is greater than said first threshold value.

10. An infrared monitoring system as claimed in claim 8, wherein said second calculation means generates said second alarm signal when said ratio is greater than 0.5.

11. An infrared monitoring system as claimed in claim 7, wherein said binarization means gives each pixel in said background area a first predetermined binary value and gives each pixel in said temperature change area a second predetermined binary value.

12. An infrared monitoring system as claimed in claim 7, wherein said difference calculation means comprises means for subtracting said temperature data related to a previous frame which is one of said two consecutive frames from said temperature data related to a latest frame which is the other one of said two consecutive frames.

13. An infrared monitoring system comprising:

an infrared camera outputting temperature data related to a pictured scene scanned in a predetermined time corresponding to one frame;

memory means for storing said temperature data supplied from said infrared camera;

difference calculation means, coupled to said memory means, for receiving said temperature data related to two consecutive frames and for calculating a difference between said temperature data related to said two consecutive frames;

binarization means, coupled to said difference calculation means, for classifying said pictured scene into a background area having no temperature change and a temperature change area having a temperature change between said two consecutive frames from said difference supplied from said difference calculation means;

extraction means, coupled to said memory means and said binarization means, for extracting temperature data related to said temperature change area from said temperature data stored in said memory means;

first calculation means, coupled to said extraction means, for detecting an alarm area having a plurality of pixels more than a threshold number of pixels and having a temperature higher than a threshold temperature and for generating a first alarm signal when said alarm area is detected;

shape recognition means, coupled to said binarization means, for determining whether or not a shape of said temperature change area corresponds to a predetermined shape and for generating a second alarm signal when it is determined that the shape of said temperature change area corresponds to said predetermined shape;

second calculation means, coupled to said extraction means, for determining whether or not a relative position of a pixel having a highest temperature contained in said temperature change area to a vertical width of said temperature change area is in a predetermined range and for generating a third alarm signal when it is determined that the relative position of said pixel is in said predetermined range, said vertical width being a width measured along a direction corresponding to a vertical direction of said pictured scene; and alarm generating means, coupled to said first and second calculation means and said shape recognition means, for generating an alarm when said first alarm signal is supplied from said first calculation means and at least one of said second and third alarm signals are supplied from said shape recognition means and said second calculation means, respectively.

14. An infrared monitoring system as claimed in claim 13, wherein said alarm generating means generates said alarm only when said first, second and third alarm signals are simultaneously supplied from said first calculation means, said shape recognition means and said second calculation means, respectively.

15. An infrared monitoring system as claimed in claim 13, wherein said shape recognition means generates said second alarm signal when determining that the shape of said temperature change area corresponds to a shape inherent in a human being.

16. An infrared monitoring system as claimed in claim 13, wherein said second calculation means generates said third alarm signal when determining that the relative position of said pixel having the highest temperature corresponds to a relative position inherent in a human being.

17. An infrared monitoring system as claimed in claim 13, further comprising display means, coupled to said difference calculation means, for displaying an output signal from said difference calculation means representative of said difference.

* * * * *